(12) United States Patent
Hug et al.

(10) Patent No.: US 6,170,805 B1
(45) Date of Patent: Jan. 9, 2001

(54) COLLARS WITHIN A RING GAP OF A MATERIAL EXCHANGE HAVING A PACKING

(75) Inventors: Albert Hug, Winterthur; Fritz Heiniger, Turbenthal; Felix Moser, Winterthur, all of (CH)

(73) Assignee: Sulzer Chemtech AG, Winterthur (CH)

( * ) Notice: Under 35 U.S.C. 154(b), the term of this patent shall be extended for 0 days.

(21) Appl. No.: 09/172,094

(22) Filed: Oct. 13, 1998

(30) Foreign Application Priority Data

Oct. 30, 1997 (EP) .................................................. 97810809

(51) Int. Cl.[7] ....................................................... B01F 3/04
(52) U.S. Cl. .................................. 261/112.2; 261/DIG. 72
(58) Field of Search ........................... 261/97, 110, 112.1, 261/112.2, DIG. 72

(56) References Cited

U.S. PATENT DOCUMENTS 5,456,865    10/1995   Pluess .

FOREIGN PATENT DOCUMENTS 2 676 371     11/1992   (FR) .
WO 96/40428   12/1996   (WO) .

*Primary Examiner*—David A. Simmons
*Assistant Examiner*—Robert Hopkins
(74) *Attorney, Agent, or Firm*—Townsend and Townsend and Crew LLP

(57) ABSTRACT

The material exchange column contains a packing which can be installed in the horizontal position of the column. The column has a ring gap between the packing and the column wall in which collars are arranged. The latter each comprise a band-shaped region (30) which lies in contact with the packing. At the upper edge of the band-shaped collar regions there adjoin spring-elastically connected surface pieces which produce a bridge to the wall and which are provided for a return conduction of the liquid from the wall to the packing during the operation of the column. It applies at least for some of the collars that the latter have elevations in their band-shaped regions which hold the ring gap open in a form-stable manner under the load of the packing when the column lies horizontally.

12 Claims, 3 Drawing Sheets

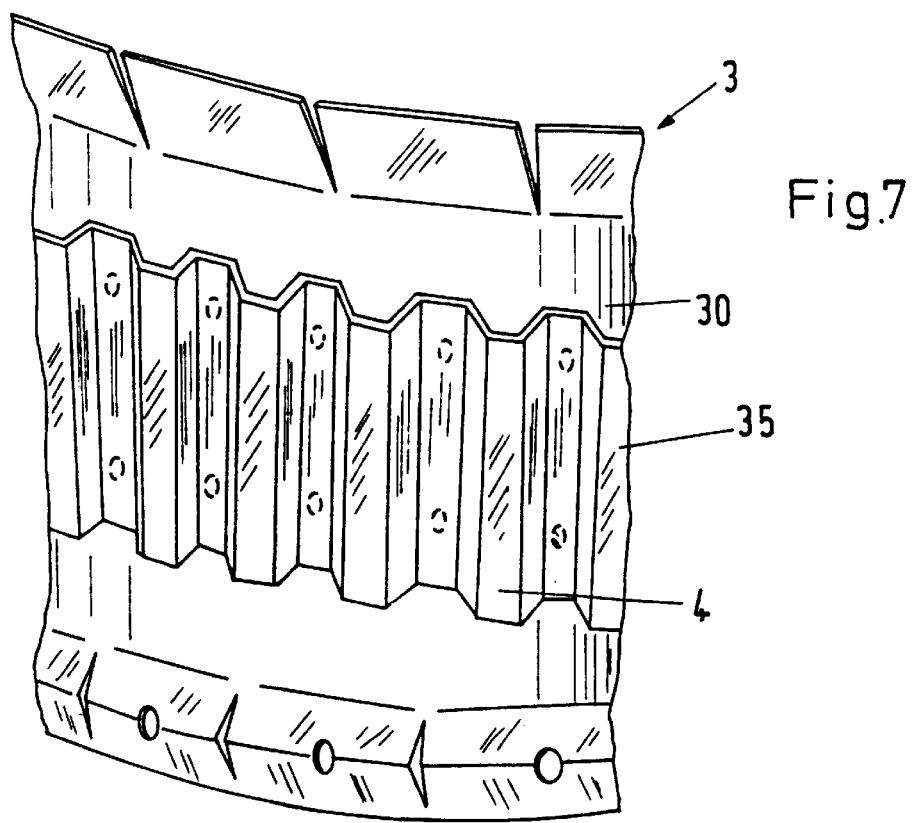
Fig. 7
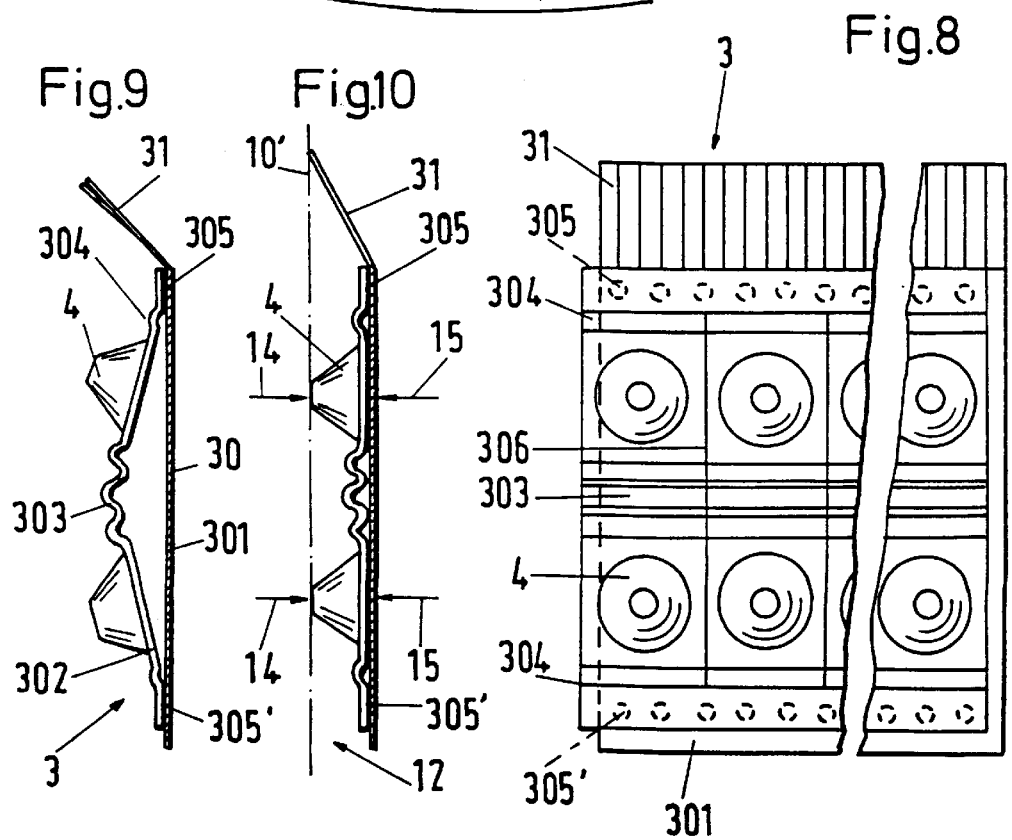
Fig. 8
Fig. 9
Fig. 10

COLLARS WITHIN A RING GAP OF A MATERIAL EXCHANGE HAVING A PACKING

BACKGROUND OF THE INVENTION

1. Field of the Invention

The invention relates to a material exchange column with a packing. The invention also relates to a packing collar of a column of this kind and to a method for installing and/or transporting the column.

2. Description of the Prior Art

A material exchange column is known from EP-A 0 601 257, the packing of which is encircled at various heights in the manner of a belt by wreath elements. The wreath elements—here called collars for short—are manufactured of thin sheet metal lamina and serve for the deflection of the material flows in the column. On the one hand, a gas flow is prevented from flowing in a ring gap adjacent to the packing along the column wall. The gas is deflected into the packing, where it enters into contact with a liquid flowing on the packing. On the other hand, the liquid which enters onto the column wall from the packing is guided back into the packing by the collars.

The packings named in EP-A 0 601 257 are as a rule built up of a plurality of filler bodies. In a particularly advantageous embodiment, a filler body has layers of corrugated lamella with channels which cross one another in an open manner. The lamella are arranged in parallel and directed in direction of the column axis. For large column diameters, the individual filler bodies are assembled from a plurality of segments. Usually such packings are installed filler body by filler body into a vertically standing column; at the same time at least one collar is inserted with each filler body into the ring gap at the edge of the packing. During the installation of the packing, i.e. when it is being built into the column, the collars must be handled with care. Deformations must be avoided which would impair the deflection function of the collars.

SUMMARY OF THE INVENTION

The named packing with openly crossing channels also permits installations when the column is in the horizontal position. An installation of this kind is advantageous, and indeed, particularly when the packing—such as for example, in the manufacture of rectifier columns for the decomposition of air—is installed at a first location and the column is to be operated at a second location. When the location is being changed, the column must be transported in the horizontal position. Measures must be taken in order that the inserts of the column are not damaged by the transport. The collars, which are manufactured of thin sheet metal, are the most endangered during transport. The collars also pose a problem already during the installation of a packing. It is therefore an object of the invention to provide means which permit the installation of the packing and the transport of the column when the column is horizontally oriented. The object is satisfied by a column with suitably formed collars described in detail hereinbelow.

The material exchange column contains a packing which can be installed in the horizontal position of the column. The column has a ring gap between the packing and the column wall in which collars are arranged. The latter each comprise a band-shaped region which lies in contact with the packing. At the upper edge of the band-shaped collar region, there adjoin spring-elastically connected surface pieces which produce a bridge to the wall of the column and which are provided for a return conduction of the liquid from the wall of the packing during the operation of the column. It applies at least for some of the collars in accordance with the invention that the latter have elevations in their band-shaped regions which hold the ring gap open in a form-stable manner under the load of the packing when the column lies horizontally.

BRIEF DESCRIPTION OF THE DRAWINGS

FIG. 7 is a sixth exemplary embodiment of the collar and FIGS. 8–10 are illustrations for a seventh exemplary embodiment.

DETAILED DESCRIPTION OF THE PREFERRED EXEMPLARY EMBODIMENTS

Figure 1:
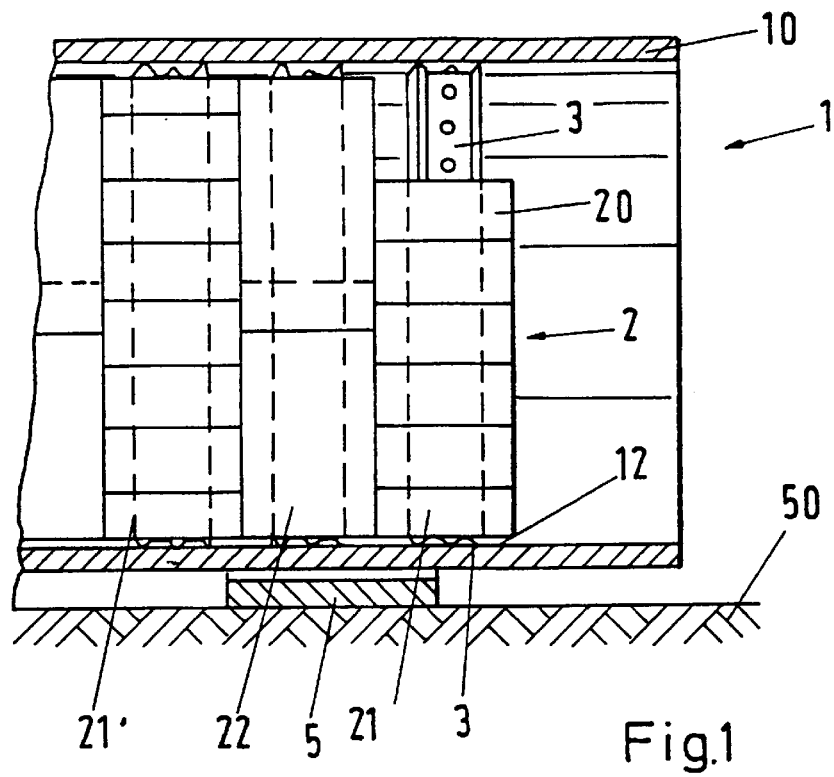
FIG. 1 is a longitudinal section through a horizontally disposed column in accordance with the invention during the installation of the packing.
Figure 2:
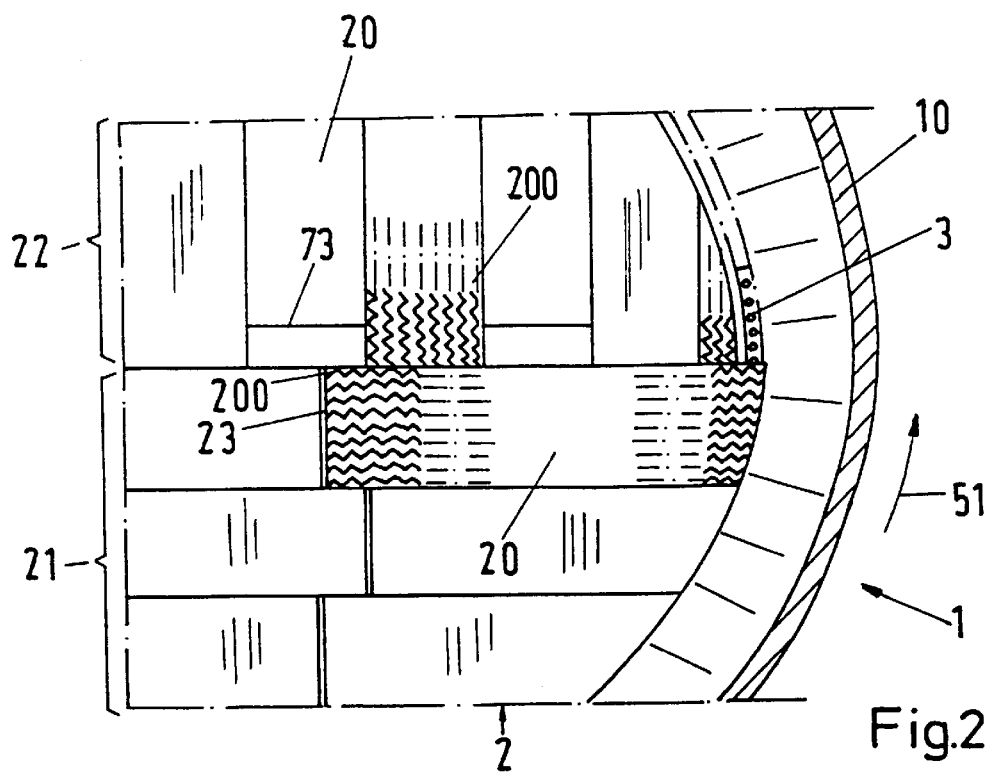
FIG. 2 is the column of FIG. 1, sectionally, in a perspective illustration and with a view in the direction of direction of the column axis.
Figure 3:
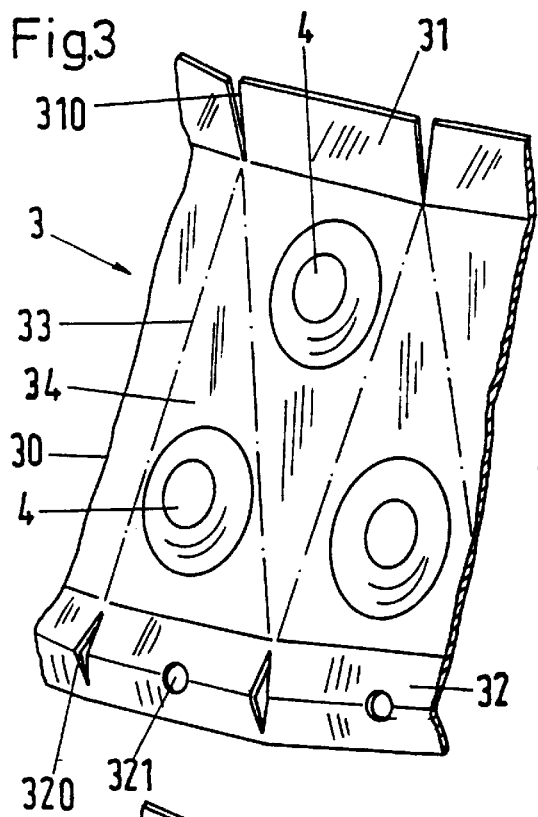
FIG. 3 is a section of a collar in accordance with the invention.
Figure 4:
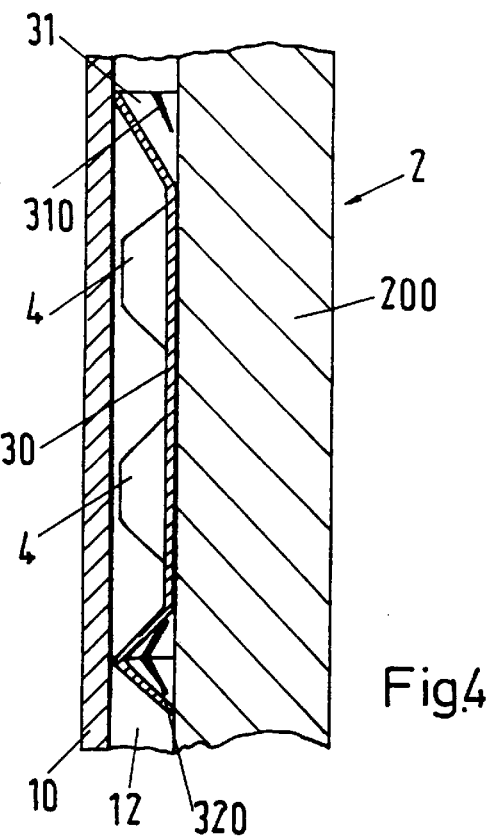
FIG. 4 is a longitudinal section through the edge region of the column with the collar of FIG. 3.

The material exchange column 1 in FIG. 1 or FIG. 2 respectively contains a packing 2 which is assembled from segments 20, with the packing 2 being only partially built in. Collars 3 are inserted in a ring gap 12 between the column wall 10 and the packing 2. The segments 20 are each assembled from a stack of corrugated lamella 200 which form openly crossing channels. Filler bodies 21, 22 and 21' which are built up of the segments 20 represent a further subdivision of the packing 2. The filler bodies 21 and 22 or 22 and 21' which are adjacent to the lamella 200 are oriented transverse to one another. Gaps 23 at interface positions between adjacent segments 20 are advantageously filled, for example, by the insertion of expandable grids. With elements of this kind, on the one hand, the position of the segments is secured; on the other hand, an additional part of the packing is formed by them.

Only a part of the collar 3 visible in FIG. 2 has yet been inserted. An additional part which is to be inserted is indicated in chain dotted lines. The collars 3 can be fastened to the column wall 10 or to the packing 2. They advantageously form separate components, however, which are held in the edge gap 12 on the basis of spring and frictional forces only. The following Figures show exemplary embodiments of collars 3 of this kind.

The column 1 is horizontally disposed and rests or is journalled on carriers 5 which stand on the floor 50. The column 1 is advantageously journalled on rollers (not shown) which enable a rotation of the column (arrow 51) about its axis. Thus, the column can be rotated in each case by for example 90° after the installation of a filler body 22 in order to have a position which is favorable for the insertion of the next filler body 21.

The collars must not be squashed under the load of the filler bodies 21, 22. This load refers to a maximum load which can arise through acceleration forces during a transport. The acceleration during jostling can amount to about four times the earth's acceleration g. This problem could be solved by means of spacer components which could be inserted in addition. Auxiliary means of this kind make the manufacture of the column more expensive, however, and in addition, they can prove to be sources of disturbances when carrying out the material exchange process. A far more advantageous solution is given by the measure in accordance with the invention, namely of providing structure elements in the collars themselves which prevent permanent deformations from resulting from the loading or stressing through the packing.

Figure 5:
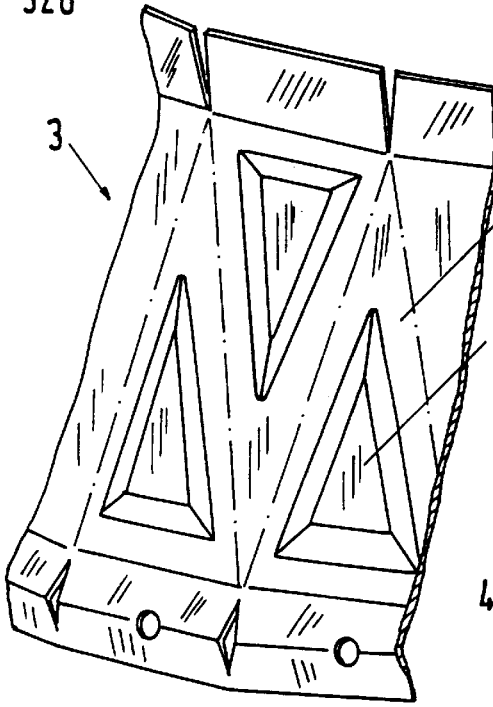
FIG. 5 is a second embodiment of the collar.

The collars 3 illustrated in FIGS. 3 to 7 are further developments in accordance with the invention of the wreath element disclosed in EP-A 0 601 257 and illustrated there in FIG. 5 and FIG. 8b. The collar 3 arranged in the ring gap 12 between the packing 2 (corrugated lamella 200) and the column wall 10—see FIGS. 3 and 4—comprises a band-shaped region 30 which lies in contact with the packing 2. At the upper edge of this region 30 there adjoin pieces of surface 31 which produce a bridge to the wall 10 and which are provided for a return conduction of the liquid from the wall 10 to the packing 2 during the operation of the column 1. A folded part 32 with indentations 320 and apertures 321 is arranged at the lower edge of the band-shaped region 30. The folded part 32 and the pieces of surface 31 are parts of a sheet metal lamina of a spring-elastic material. This sheet metal lamina is formed in such a manner that the collar 3 can be fastened or clamped in the ring gap 12 as a result of spring forces.

Indentations 310 between the pieces of surface 31 are arranged displaced with respect to the indentations 320 in the folded part 32. (The indentations 310 and 320 can also be arranged differently.) Through the curvature of the collar 3 in the ring gap 12, straight bend lines 33 result between the indentations 310 and 320 which subtend subsurfaces 34 having the form of isosceles triangles. Knob-like elevations 4 are arranged in the inner regions of these subsurfaces 34 through punching or deep drawing. They stiffen the subsurfaces 34 but do not impair their bending along the lines 33. These elevations 4 hold the ring gap 12 open in a form-stable manner when the column 1 is horizontally disposed. The laminar thickness of the collar 3 and the number and distribution of the elevations 4 are designed in such a manner that the elevations 4 suffer practically no lasting deformation under a maximum loading of the packing 2. A slight deformation is tolerable if the deflection function of the collars is maintained. When the column stands erect the elevations 4 need not touch the wall 10.

The collar 3 which completely encircles the packing 2 consists of one piece which surrounds the entire periphery of the packing 2; or it is assembled from two or more pieces. Each piece is manufactured of sheet steel capable of deep drawing, preferably of a sheet steel with a thickness in the range from about 0.1 to 0.3 mm. The elevations 4 are formed in the shape of knobs and arranged in two mutually displaced rows along the band shaped region 30, with the spacings between adjacent elevations of a row lying in the range from 2 to 8 cm, preferably about 4 cm.

In the example of FIG. 5 the elevations 4 are formed as blunt or truncated pyramids with three side surfaces corresponding to the form of the subsurfaces 34. A further pyramid form of the elevations 4 can be seen in FIG. 6 in addition to two further examples.

Figure 6:
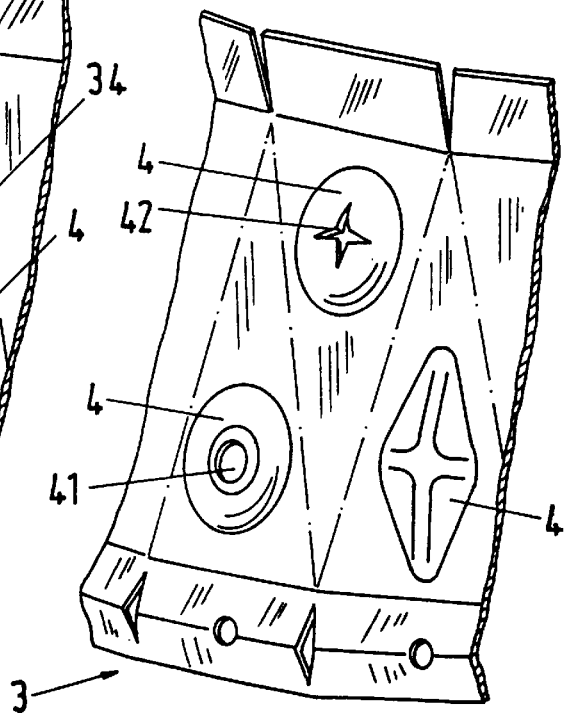
FIG. 6 is a representation of knob-shaped elevations of three further embodiments.

Tears in the sheet metal can develop during the deep drawing of the knob-shaped elevations 4. To avoid these tears an aperture can be provided at the highest points of the elevations 4 in each case: for example a punched hole 41 or an incision 42, as illustrated in FIG. 6.

The band-shaped collar region 30 can also be formed in two layers, or at least partially in two layers: see the sixth exemplary embodiment in FIG. 7 and the seventh exemplary embodiment in FIGS. 8 to 10. The layer 35 or 36 respectively nearer the column wall 10 is structured with the elevations 4, in FIG. 7 with folded out ribs, in the seventh example again with knobs.

In the example of FIGS. 8 to 10 (FIG. 8: plan view, FIGS. 9, 10: side view), the material deflection function is taken over by a thin film 301, at the upper end of which narrow pieces of surface 31 provide for a bridging of the ring gap 12 and—in comparison with wide pieces of surface 31—produce a tighter contact to the bent wall surface 10'. The elevations 4 are punched into a second, substantially thicker lamina 302. The two layers 301 and 302 are connected to one another by point weldings 305, 305'. Thanks to spring regions 303 and 304, the second layer 302 can be pressed against the first layer 301; in this situation the band-shaped region 30 between the welding points 305 and 305' is placed under tension and possibly stretched. FIG. 9 shows the relaxed form of the collar 3, FIG. 10 the tensed or stretched form. The arrow 15 indicates a compression force exerted by the packing 2; the arrow 14 indicates the corresponding opposing force of the column wall 2 which acts on the knobs 4. Slits 306 are provided in the layer 302 and accordingly open easily during the installation of the packing 2 in accordance with the curvature of the ring gap 12.

Plants with material exchange columns are known which are used on ships or on floating platforms. Due to the swaying floor on which these columns stand, their packings are subject to mechanical stresses similar to those in a transport of the column. Therefore, the collars in accordance with the invention can also advantageously be used in this field of application.

What is claimed is:

1. A material exchange column comprising a packing that is installed in the horizontal position of the column, the column having a ring gap between the packing and a column wall in which collars are arranged that each comprise a band-shaped region that lies in contact with the packing, wherein at least some of the collars have elevations in their band-shaped regions that hold the ring gap open in a form-stable manner under the load of the packing when the column lies horizontally, wherein the collars that are arranged in the ring gap each have subsurfaces in the shape of triangles bounded by straight bend lines in their band-shaped regions, wherein the elevations are arranged in the inner regions of these subsurfaces, wherein at an upper edge of the band-shaped regions, bridging pieces are provided that define first indentations therebetween and at a lower edge of the band-shaped regions, a folded part is provided that includes second indentations, and wherein the first indentations are displaced with respect to the second indentations.

2. A material exchange column in accordance with claim 1 wherein the band-shaped collar regions consist at least partially of deformable sheet metal; and wherein the elevations are produced by deformation of these metal sheets.

3. A material exchange column in accordance with claim 1 wherein the band-shaped collar regions are at least partially formed in two layers; and wherein the layer which is nearer the column wall is structured with the elevations.

4. A material exchange column in accordance with claim 1 wherein the collars are fixed between the wall and the packing only as a result of spring and frictional forces, with the spring forces being produced by suitably formed parts of the collars.

5. A material exchange column in accordance with claim 1 wherein the elevations are knobs in a metal sheet, the highest points of which each have an aperture.

6. A material exchange column in accordance with claim 1 wherein the packing is built up of filler bodies, which in each case contain layers of corrugated lamella which are arranged in parallel, are directed in the direction of direction of the column axis and have openly crossing channels.

7. A collar for a packing of a material exchange column, wherein the packing is installed in the horizontal position of the column and the column has a ring gap between the packing and a column wall in which collars are arranged, the collar comprising a band-shaped region that lies in contact with the packing, wherein the collar has elevations in its band-shaped region that hold the ring gap open in a form-stable manner under the load of the packing when the column lies horizontally, wherein the collar has subsurfaces in the shape of triangles bounded by straight bend lines in its band-shaped region and the elevations are arranged in the inner regions of these subsurfaces, wherein at an upper edge of the band-shaped regions, bridging pieces are provided that define first indentations therebetween and at a lower edge of the band-shaped region, a folded part is provided that includes second indentations, wherein the first indentations are displaced with respect to the second indentations, wherein the collar consists of at least one piece and each at least one piece is manufactured of deep drawing sheet metal, and wherein the elevations are formed in knob shape and are arranged in two mutually displaced rows along the band-shaped region, with the distances between adjacent elevations in a row lying in a range from 2 to 8 cm.

8. A collar in accordance with claim 7 wherein the distance between adjacent elevations in a row is about 4 centimeters.

9. A method for the installation of a packing in a material exchange column, the method comprising:

bringing an empty column into a horizontal position;

building the collars and the packing, which is subdivided into segments, into the column such that the column has a ring gap between the packing and a column wall in which collars are arranged that each comprise a band-shaped region that lies in contact with the packing, wherein at least some of the collars have elevations in their band-shaped regions that hold the ring gap open in a form-stable manner under the load of the packing when the column lies horizontally, wherein the collars that are arranged in the ring gap each have subsurfaces in the shape of triangles bounded by straight bend lines in their band-shaped regions, wherein the elevations are arranged in the inner regions of these subsurfaces, wherein at an upper edge of the band-shaped regions, bridging pieces are provided that define first indentations therebetween and at a lower edge of the band-shaped regions, a folded part is provided that includes second indentations, and wherein the first indentations are displaced with respect to the second indentations; and filling gaps at interface positions between segments.

10. A method in accordance with claim 9 wherein the gaps are filled through the insertion of expandable grids.

11. A method in accordance with claim 9 wherein the installation of the packing is carried out at a first location in the horizontal or vertical position column, wherein the column is set up in a second location, and wherein the column is transported from the first location to the second location lying in a horizontal position.

12. A material exchange column comprising a packing that is installed in the horizontal position of the column, said column having a ring gap between the packing and the column wall in which collars are arranged that each comprise a band-shaped region that lies in contact with the packing, wherein at least some of the collars have elevations in their band-shaped regions that hold the ring gap open in a form-stable manner under the load of the packing when the column lies horizontally, and wherein the elevations are knobs in a metal sheet, the highest points of which each have an aperture.

* * * * *